July 29, 1969    N. E. IRWIN    3,458,067
LATERAL DISCHARGE FARM WAGON
Filed July 26, 1967
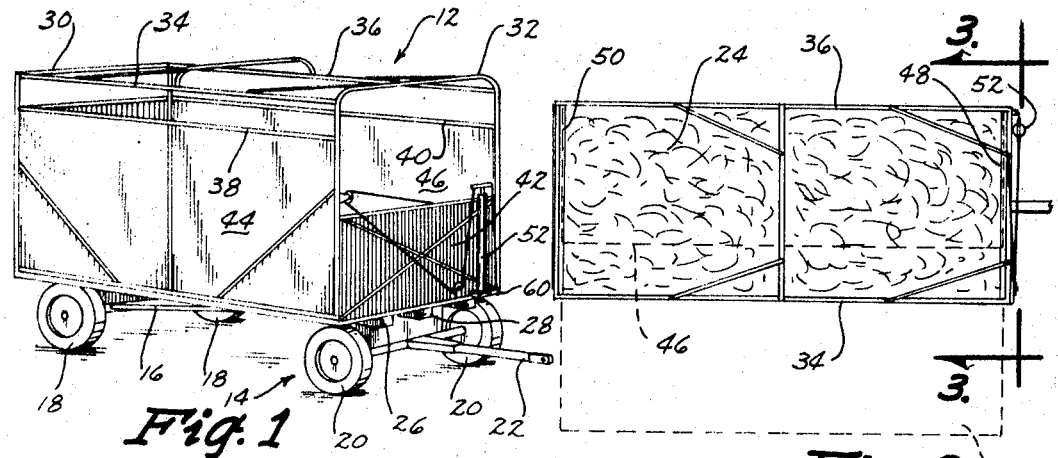
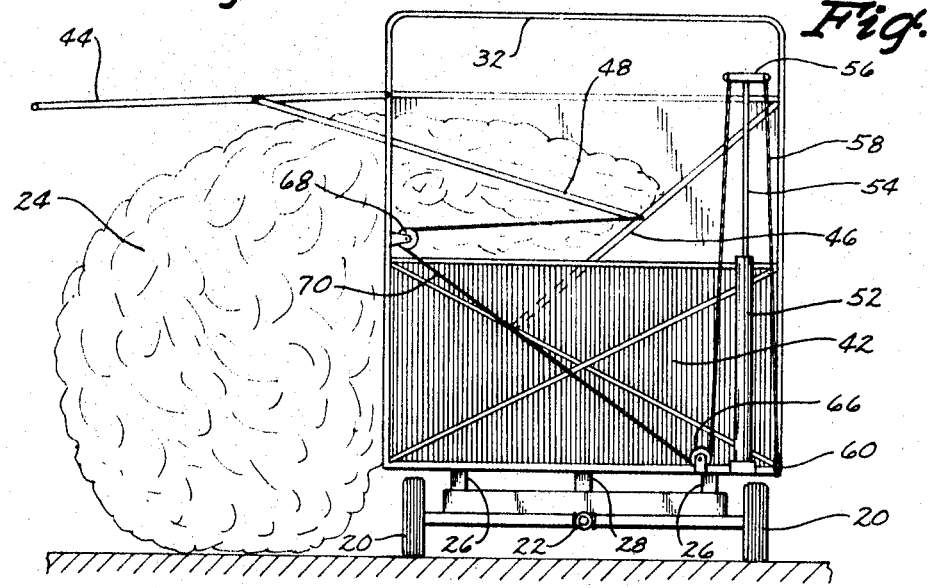
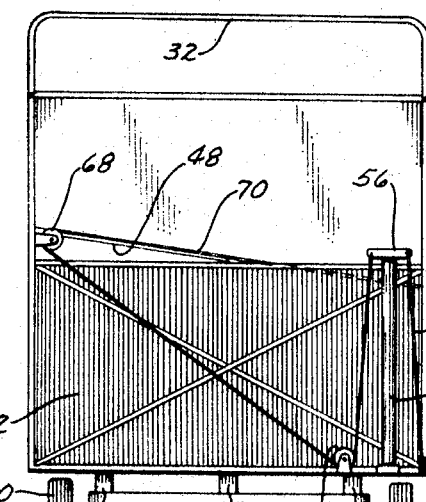
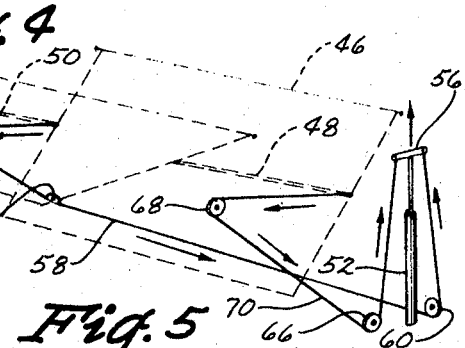
INVENTOR
NEIL E. IRWIN
BY
Dick, Zarley, McKee & Thomte
ATTORNEYS

United States Patent Office 3,458,067
Patented July 29, 1969

3,458,067
LATERAL DISCHARGE FARM WAGON
Neil E. Irwin, Sac City, Iowa 50583
Filed July 26, 1967, Ser. No. 656,080
Int. Cl. B60p *1/00*
U.S. Cl. 214—82   3 Claims

ABSTRACT OF THE DISCLOSURE

A lateral discharge farm wagon consisting of a frame means mounted on a wheeled flat bed rack. The frame means includes front and rear walls having side walls extending therebetween. The side walls are pivoted at their upper ends about a horizontal axis and are interconnected so that they may be pivoted to cause the material to be discharged laterally from the wagon.

---

In forage harvester operations, the husks and other crop residues are usually dropped into a wagon and carried to the farm yard where the husks and/or crop residues are used for livestock bedding. A problem arises because this material is very light and the normal hydraulic lift system on a wagon is not effective in dumping the material therefrom with the result that most of the unloading must be done by hand.

Therefore, it is a principal object of this invention to provide a lateral discharge farm wagon.

A further object of this invention is to provide a lateral discharge farm wagon which effectively forces the material contained therein in a lateral direction.

A further object of this invention is to provide a lateral discharge farm wagon including a pair of pivotal side walls which are pivoted laterally to effect the dumping operation.

A further object of this invention is to provide a lateral discharge farm wagon which may be mounted on any conventional flat bed rack.

A further object of this invention is to provide a lateral discharge farm wagon which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the wagon;

FIG. 2 is a top view of the wagon with the broken lines indicating the position of the side walls after having been pivoted laterally;

FIG. 3 is a partial front view of the wagon when the side walls are in a vertical position;

FIG. 4 is a front view of the wagon illustrating the position to which the side walls may be pivoted to effect the lateral dumping operation; and FIG. 5 is a schematic perspective view illustrating the manner in which the side walls are pivoted by the hydraulic cylinder and the interconnection therewith.

The wagon of this invention is generally designated by the reference numeral 10 and includes a metal frame means 12 which is mounted on a conventional flat bed rack 14. Flat bed rack 14 includes a chassis 16 which is supported by a pair of rear wheels 18 and a pair of front wheels 20. A hitch 22 extends forwardly from the chassis 16 to permit the wagon 10 to be detachably connected to a forage harvester or the like.

Frame means 12 includes a bottom 24 which is secured to a pair of longitudinally extending frame members 26 and 28 which are secured to chassis 16. An inverted U-shaped support member 30 is secured to the rearward end of bottom 24 and extends upwardly therefrom as best seen in FIG. 1. An inverted U-shaped support member 32 is secured to the forward end of bottom 24 and extends upwardly therefrom as also best seen in FIG. 1. A pair of longitudinally extending braces 34 and 36 are secured to and extend between the upper ends of support members 30 and 32. A brace 38 extends between the sides of support members 30 and 32 as best seen in FIG. 1 and a brace 40 extends between the other sides of support members 30 and 32 as also illustrated in FIG. 1.

A front wall 42 is secured to support member 32 and extends upwardly from bottom 24. As seen in FIG. 1, the height of front wall 42 is less than the height of support member 32 thereby providing an opening through which the corn husks may be blown into the wagon. A side wall 44 is pivotally connected at its upper end to brace 38 by any convenient means and extends downwardly therefrom to effectively close one side of the wagon. A side wall 46 is pivotally connected by any convenient means at its upper end to brace 40 and extends downwardly therefrom to effectively close the other side of the wagon 10. An arm member 48 is pivotally connected at one end to the forward end of side wall 46 at a point downwardly from the upper end thereof and is pivotally connected at its other end to the front end of wall 44 at a point downwardly of the upper end thereof as best seen in FIG. 4. Likewise, an arm member 50 is pivotally connected to the rearward ends of side walls 46 and 44 and extends therebetween as does arm member 48.

A vertically disposed hydraulic cylidner 52 is secured at its lower end to the front portion of wagon 10 and has a piston rod 54 extending upwardly therefrom. A bracket 56 is secured to the upper end of rod 54 for movement therewith. A cable 58 is secured at one of its ends to one end of bracket 56 and extends downwardly therefrom and around a pulley 60 which is rotatably secured to the forward end of the wagon 10 as seen in FIG. 4. Cable 58 extends rearwardly from pulley 60 and passes around a pulley 62 which is secured to the rearward end of the wagon as illustrated in FIGS. 2 and 5. A pulley 64 is secured to supporting member 30 and cable 58 extends therearound and is secured to side wall 46 at the point where arm member 50 is pivotally connected thereto. A pulley 66 is rotatably secured to the wagon as illustrated in FIG. 4 at a point laterally of hydraulic cylinder 52 and a pulley 68 is secured to supporting member 32 adjacent the forward end of wall 44 as illustrated in FIGS. 1 and 4. A cable 70 is secured to the other end of bracket 56 and extends around pulleys 66 and 68 and is connected to the side wall 46 at the point which arm member 48 is pivotally connected thereto as illustrated in FIGS. 4 and 5. Hydraulic cylinder 52 is connected to the hydraulic system of the tractor which would be pulling the forage harvester to permit the selective actuation of the cylinder 52 as desired. Cylinder 52 may be of either the single or double acting type but the double acting type is the preferred embodiment.

Preferably, walls 20, 42 and 46 are constructed of a metal material such as corrugated steel or aluminum while side wall 44 may be constructed of a wire mesh material. However, if desired, a corrugated metal material could also be used on side wall 44 in lieu of the wire net.

In operation, the wagon 10 is connected directly behind the forage harvester or stationary sheller which will discharge the material into the interior of the wagon above front wall 42. When the wagon is filled, the wagon may be transported to the desired location for the dumping of the material contained therein. The dumping operation is accomplished by activating hydraulic cylinder 52 which has its piston rod normally retracted as illustrated in FIG. 1. The extension of piston rod 54 from the hydraulic cylinder 52 causes the cables 58 and 70 to pivot the side wall 46 from the vertical position to the position seen in FIG. 4. Side wall 44 is also pivoted laterall simultaneously with the pivotal movement of side wall 46 due to the fact that arm members 48 and 50 interconnect the same. Thus, the lateral pivotal movement of side wall 46 forces the material in the wagon in a lateral direction therefrom beneath the side wall 44 which has been pivoted to the position seen in FIG. 4. The wagon may then be pulled forwardly after the material has been dumped therefrom and the hydraulic cylinder 52 can then be operated to cause the retraction of piston rod 54 therein so that the side walls 44 and 46 will return to their normal vertical position seen in FIG. 1. The wagon is then ready to be again filled. The hydraulic cylinder cable means for actuating the side walls (FIG. 5) is the preferred means but a single hydraulic cylinder could also be used if desired. A double acting cylinder could be connected at its base to either the front or back wall and could have its piston rod connected to side wall 44. The side walls would still be interconnected as shown in the drawings.

The flat bed rack 14 is of conventional design and a large majority of farmers own devices of this type. The structure of the frame means 12 is such that it can be secured to the conventional flat bed track 14 so that the farmers may readily adapt the frame means 12 for use on the rack 14. After the harvesting has been completed, the metal frame means 12 may be removed from the rack 14 so that the rack 14 can be used for other purposes.

Thus it can be seen from the foregoing that the device accomplishes at least all of its stated objectives.

Some changes may be made in the construction and arrangement of my lateral discharge farm wagon without departing from the real spirit and purpose of my invention, and it is my intention to cover by my claims, any modified forms of structure or use of mechanical equivalents which may be reasonably included within their scope.

I claim:
1. In a lateral discharge farm wagon,
   a frame means adapted to be mounted on a wheeled support means having hitch means extending forward therefrom and adapted to be secured to a prime mover,
   said frame means including a bottom, front and back walls extending upwardly from said bottom, and opposite side walls extending between said front and back walls,
   said side walls being pivotal about a horizontal axis at their upper ends whereby said side walls may be pivotally moved so that one of said side walls will force the material in said frame means laterally therefrom beneath the other of said side walls,
   means interconnecting said side walls to effect their coordinated piovtal movement,
   and hydraulic cylinder means connected to at least one of said side walls to pivotally move the same.

2. The wagon of claim 1 wherein said means interconnecting said side walls includes a pair of spaced apart arm members pivotally secured at their opposite ends to said side walls and extending therebetween, said arm members being secured to said side walls, intermediate the upper and lower ends thereof.

3. In a lateral discharge farm wagon,
   a frame means adapted to be mounted on a wheeled support means,
   said frame means including a bottom, front and back walls extending upwardly from said bottom, and opposite side walls extending between said front and back walls,
   said side walls being pivotal about a horizontal axis at their upper ends whereby said side walls may be pivotally moved so that one of said side walls will force the material in said frame means laterally therefrom beneath the other of said side walls,
   means interconnecting said side walls to effect their coordinated pivotal movement,
   and power means operatively connected to at least one of said side walls to pivotally move the same,
   said power means including a hydraulic cylinder means having a cable means secured to its piston rod, said cable means being secured to at least one of the said side walls whereby the extension of said piston rod will cause said side walls to be pivotally moved.

References Cited

UNITED STATES PATENTS

| 1,088,100 | 2/1914  | Saunders et al. | 214—82    |
| 1,478,831 | 12/1923 | Long et al.     | 296—11    |
| 2,430,973 | 11/1947 | Boissonnault    | 214—82 X  |
| 3,132,736 | 5/1964  | May et al.      | 198—128 X |

FOREIGN PATENTS

| 462,789 | 4/1951  | Italy. |
| 505,502 | 12/1954 | Italy. |

ALBERT J. MAKAY, Primary Examiner

U.S. Cl. X.R.

214—83.18